United States Patent
Wu et al.

(10) Patent No.: US 11,624,666 B2
(45) Date of Patent: Apr. 11, 2023

(54) ESTIMATING DOWNHOLE RPM OSCILLATIONS

(71) Applicant: SCHLUMBERGER TECHNOLOGY CORPORATION, Sugar Land, TX (US)

(72) Inventors: Jian Wu, Houston, TX (US); Ramakrishna Madhireddy, Cypress, TX (US); Nathaniel Wicks, Somerville, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 50 days.

(21) Appl. No.: 17/044,376

(22) PCT Filed: Jun. 3, 2019

(86) PCT No.: PCT/US2019/035144
§ 371 (c)(1),
(2) Date: Oct. 1, 2020

(87) PCT Pub. No.: WO2019/232516
PCT Pub. Date: Dec. 5, 2019

(65) Prior Publication Data
US 2021/0095555 A1    Apr. 1, 2021

Related U.S. Application Data

(60) Provisional application No. 62/679,311, filed on Jun. 1, 2018.

(51) Int. Cl.
*G01L 5/00* (2006.01)
*E21B 44/04* (2006.01)

(52) U.S. Cl.
CPC ............ *G01L 5/0061* (2013.01); *E21B 44/04* (2013.01)

(58) Field of Classification Search
CPC .............................. E21B 44/04; G01L 5/0061
See application file for complete search history.

(56) References Cited

U.S. PATENT DOCUMENTS

| 1,058,457 A | 4/1913 | Nielsen |
| 6,050,348 A | 4/2000 | Richarson et al. |

(Continued)

FOREIGN PATENT DOCUMENTS

| CN | 109138970 A | * | 1/2019 | ............. E21B 44/00 |
| WO | WO-2013112056 A1 | * | 8/2013 | ......... E21B 41/0092 |

OTHER PUBLICATIONS

Kyllingstad, A. et al., "A New Stick-Slip Prevention System", SPE 119660, presented at the SPE/IAC Drilling Conference and Exhibition, Amsterdam, the Netherlands, 2009, 14 pages.

(Continued)

*Primary Examiner* — Jennifer H Gay
(74) *Attorney, Agent, or Firm* — Cameron Sneddon

(57) ABSTRACT

Methods and apparatus for including obtaining raw surface data for present values of torque ($T_{TD}$) generated by a top drive operably coupled with a drillstring, obtaining raw surface data for present values of rotational speed (ω) of the top drive corresponding to the $T_{TD}$, obtaining inertia ($J_{TD}$) of the top drive, and estimating torque $T_{ST}$ of the drillstring based on the obtained $T_{TD}$ data, the obtained data, and the obtained $J_{TD}$ data. The estimated drillstring torque $T_{ST}$ may be utilized to determine a surface torque oscillation performance index (STOPI).

20 Claims, 7 Drawing Sheets

(56) References Cited

U.S. PATENT DOCUMENTS

| | | | |
|---|---|---|---|
| 6,166,654 A | 12/2000 | Van Den Steen | |
| 6,327,539 B1 | 12/2001 | Keultjes et al. | |
| 6,338,390 B1 | 1/2002 | Tibbitts | |
| 6,802,378 B2 | 10/2004 | Haci et al. | |
| 6,918,453 B2 * | 7/2005 | Haci | E21B 7/068 |
| | | | 175/26 |
| 7,096,979 B2 | 8/2006 | Haci et al. | |
| 7,152,696 B2 | 12/2006 | Jones | |
| 7,404,454 B2 | 7/2008 | Hulick | |
| 7,461,705 B2 | 12/2008 | Hulick et al. | |
| 7,588,100 B2 | 9/2009 | Hamilton | |
| 7,757,759 B2 * | 7/2010 | Jahn | E21B 19/166 |
| | | | 166/380 |
| 7,802,634 B2 | 9/2010 | Boone | |
| 7,810,584 B2 | 10/2010 | Haci et al. | |
| 7,823,655 B2 | 11/2010 | Boone et al. | |
| 8,360,171 B2 | 1/2013 | Boone et al. | |
| 8,387,720 B1 * | 3/2013 | Keast | E21B 3/02 |
| | | | 175/26 |
| 8,528,663 B2 | 9/2013 | Boone | |
| 8,602,126 B2 | 12/2013 | Boone et al. | |
| 8,672,055 B2 | 3/2014 | Boone et al. | |
| 8,689,906 B2 | 4/2014 | Nessjoen et al. | |
| RE44,956 E | 6/2014 | Richardson et al. | |
| RE44,973 E | 7/2014 | Richardson et al. | |
| 8,939,233 B2 | 1/2015 | Edbury et al. | |
| 8,939,234 B2 | 1/2015 | Mebane, III et al. | |
| 8,950,512 B2 | 2/2015 | Nessjoen et al. | |
| 8,977,523 B2 * | 3/2015 | Ertas | E21B 45/00 |
| | | | 703/2 |
| 9,145,768 B2 | 9/2015 | Normore et al. | |
| 9,181,792 B2 | 11/2015 | Pena | |
| RE45,898 E | 2/2016 | Maidla et al. | |
| 9,249,655 B1 | 2/2016 | Keast et al. | |
| 9,290,995 B2 | 3/2016 | Boone et al. | |
| 9,309,760 B2 | 4/2016 | Haci et al. | |
| 9,359,881 B2 | 6/2016 | DiSantis | |
| RE46,090 E | 8/2016 | Maidla et al. | |
| 9,404,307 B2 | 8/2016 | Maidla | |
| 9,424,667 B2 | 8/2016 | Pena et al. | |
| 9,506,336 B2 | 11/2016 | Orbell | |
| 9,581,008 B2 | 2/2017 | Kyllingstad | |
| 9,593,567 B2 | 3/2017 | Pink et al. | |
| 9,598,904 B2 | 3/2017 | Aldred et al. | |
| 9,650,880 B2 | 5/2017 | Bowley et al. | |
| 9,689,250 B2 * | 6/2017 | Badkoubeh | E21B 3/035 |
| 9,784,035 B2 | 10/2017 | Boone et al. | |
| 9,885,231 B2 | 2/2018 | Nessjoen et al. | |
| 9,920,612 B2 | 3/2018 | Dwars et al. | |
| 9,932,811 B2 | 4/2018 | Dwars et al. | |
| 9,952,119 B2 | 4/2018 | Simanjuntak et al. | |
| 10,036,678 B2 | 7/2018 | Fisher, Jr. et al. | |
| 10,053,971 B2 * | 8/2018 | Lai | E21B 44/00 |
| RE47,105 E | 10/2018 | Maidla et al. | |
| 10,125,598 B2 | 11/2018 | Dykstra et al. | |
| 10,208,580 B2 | 2/2019 | Benson et al. | |
| 10,233,740 B2 | 3/2019 | Patterson et al. | |
| 10,301,877 B2 | 5/2019 | Schaaf et al. | |
| 10,309,211 B2 * | 6/2019 | Kyllingstad | E21B 47/00 |
| 10,378,282 B2 | 8/2019 | Hadi et al. | |
| 10,415,363 B2 | 9/2019 | Mauldin et al. | |
| 10,415,365 B2 | 9/2019 | Edbury et al. | |
| 10,472,944 B2 | 11/2019 | Wassell | |
| 10,487,642 B2 | 11/2019 | Haci et al. | |
| 10,533,407 B2 | 1/2020 | Nessjoen et al. | |
| 10,533,409 B2 | 1/2020 | Benson et al. | |
| 10,584,572 B2 | 3/2020 | Dwars et al. | |
| 10,612,367 B2 | 4/2020 | Orban et al. | |
| 10,612,989 B2 | 4/2020 | Jeffryes | |
| 10,689,967 B2 | 6/2020 | Jeffryes et al. | |
| 10,724,358 B2 | 7/2020 | Hadi et al. | |
| 10,760,417 B2 | 9/2020 | Orban | |
| 10,782,197 B2 * | 9/2020 | Wu | G01L 5/0061 |
| 10,787,896 B2 | 9/2020 | Dykstra et al. | |
| 10,895,142 B2 * | 1/2021 | Jeffryes | E21B 3/035 |
| 10,927,658 B2 | 2/2021 | Jeffryes | |
| 11,098,573 B2 * | 8/2021 | Vakil | E21B 47/00 |
| 2007/0251701 A1 * | 11/2007 | Jahn | E21B 19/166 |
| | | | 166/77.1 |
| 2012/0130693 A1 * | 5/2012 | Ertas | E21B 44/00 |
| | | | 703/2 |
| 2014/0360779 A1 * | 12/2014 | Kyllingstad | E21B 44/00 |
| | | | 175/24 |
| 2015/0107897 A1 | 4/2015 | Nessjoen et al. | |
| 2015/0275648 A1 * | 10/2015 | Wang | E21B 44/00 |
| | | | 702/9 |
| 2015/0322766 A1 * | 11/2015 | Veltman | E21B 44/00 |
| | | | 340/853.6 |
| 2016/0076354 A1 * | 3/2016 | Lai | E21B 44/00 |
| | | | 702/9 |
| 2016/0138382 A1 * | 5/2016 | Badkoubeh | E21B 44/00 |
| | | | 175/24 |
| 2016/0281488 A1 * | 9/2016 | Dwars | G01P 3/44 |
| 2017/0101861 A1 | 4/2017 | Kyllingstad | |
| 2017/0152736 A1 * | 6/2017 | Kyllingstad | E21B 44/00 |
| 2018/0128093 A1 | 5/2018 | Jeffryes et al. | |
| 2018/0149010 A1 | 5/2018 | Zheng et al. | |
| 2018/0149012 A1 | 5/2018 | Dwars et al. | |
| 2018/0156023 A1 | 6/2018 | Dykstra et al. | |
| 2018/0274352 A1 | 9/2018 | Orban | |
| 2019/0048706 A1 | 2/2019 | Benson et al. | |
| 2019/0106976 A1 | 4/2019 | Badgwell et al. | |
| 2019/0120039 A1 | 4/2019 | Gillan | |
| 2019/0120040 A1 | 4/2019 | Zhao et al. | |
| 2019/0145240 A1 | 5/2019 | Benson et al. | |
| 2019/0284923 A1 * | 9/2019 | Vakil | E21B 3/02 |
| 2020/0003046 A1 | 1/2020 | Zheng et al. | |
| 2020/0072033 A1 | 3/2020 | Mauldin et al. | |
| 2020/0318472 A1 | 10/2020 | Jeffryes et al. | |
| 2020/0325763 A1 * | 10/2020 | Veltman | E21B 44/00 |
| 2020/0378237 A1 * | 12/2020 | Wicks | E21B 7/067 |
| 2020/0400007 A1 | 12/2020 | Wu et al. | |
| 2021/0010882 A1 | 1/2021 | Wu et al. | |
| 2021/0011048 A1 | 1/2021 | Wu et al. | |
| 2021/0062636 A1 | 3/2021 | Jeffryes et al. | |
| 2021/0095555 A1 * | 4/2021 | Wu | E21B 43/12 |
| 2021/0131259 A1 * | 5/2021 | Jeffryes | E21B 44/04 |

OTHER PUBLICATIONS

Kyllingstad, A. et al., "A Study of Slip/Stick Motion of the Bit", SPE Drilling Engineering, Dec. 1988, pp. 369-373.

Examination report issued in Saudi Arabian Patent Appl. No. 520420665 dated Sep. 12, 2022; 16 pages (with English translation).

* cited by examiner

ESTIMATING DOWNHOLE RPM OSCILLATIONS

CROSS-REFERENCE TO RELATED APPLICATIONS

This application claims priority to and the benefit of U.S. Provisional Application No. 62/679,311, titled "PROCESS FOR ESTIMATING DOWNHOLE RPM OSCILLATIONS," filed Jun. 1, 2018, and international application serial number PCT/US2019/035144 filed Jun. 3, 2019, titled "ESTIMATING DOWNHOLE RPM OSCILLATIONS." Both applications are hereby incorporated herein by reference.

BACKGROUND OF THE DISCLOSURE

A top drive is a drilling rig component that is located above the rig floor and can move vertically along a derrick. It is a rotational mechanical device providing torque for a drill bit to drill through subterranean formations. The top drive is controlled by an AC/DC variable frequency drive (VFD). The VFD calculates and reports the torque values to a control system.

Friction along the wellbore and formation changes can cause the drill bit and the adjacent bottom hole assembly (BHA) to suffer stick-slip downhole. Stick-slip generates torsional waves travelling from downhole to the surface. The torsional waves are reflected in the top drive torque readings as oscillations in different degrees of magnitudes.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces a method including obtaining raw surface data for present values of torque ($T_{TD}$) generated by a top drive operably coupled with a drillstring, obtaining raw surface data for present values of rotational speed ($\omega$) of the top drive corresponding to the $T_{TD}$, obtaining inertia ($J_{TD}$) of the top drive, and estimating torque $T_{ST}$ of the drillstring based on the obtained $T_{TD}$ data, the obtained $\omega$ data, and the obtained $J_{TD}$ data. The estimated drillstring torque $T_{ST}$ may be utilized to determine a surface torque oscillation performance index (STOPI).

The present disclosure also introduces an apparatus including a first sensor operable for obtaining raw surface data for present values of torque ($T_{TD}$) generated by a top drive operably coupled with a drillstring, a second sensor operable for obtaining raw surface data for present values of rotational speed ($\omega$) of the top drive corresponding to the $T_{TD}$, and a processing device comprising a processor and a memory storing computer program code. The processing device is operable to obtain inertia ($J_{TD}$) of the top drive and estimate torque $T_{ST}$ of the drillstring based on the obtained $T_{TD}$ data, the obtained co data, and the obtained $J_{TD}$ data. The processing device may be further operable to utilize the estimated drillstring torque $T_{ST}$ to determine a STOPI.

The present disclosure also introduces a computer program product including a non-transitory, computer-readable medium having instructions recorded thereon that, when executed by a processing device having a processor and a memory, cause the processing device to obtain raw surface data for present values of torque ($T_{TD}$) generated by a top drive operably coupled with a drillstring, obtain raw surface data for present values of rotational speed ($\omega$) of the top drive corresponding to the $T_{TD}$, obtain inertia ($J_{TD}$) of the top drive, and estimate torque $T_{ST}$ of the drillstring based on the obtained $T_{TD}$ data, the obtained co data, and the obtained $J_{TD}$ data. The instructions may further cause the processing device to utilize the estimated drillstring torque $T_{ST}$ to determine a STOPI.

These and additional aspects of the present disclosure are set forth in the description that follows, and/or may be learned by a person having ordinary skill in the art by reading the material herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
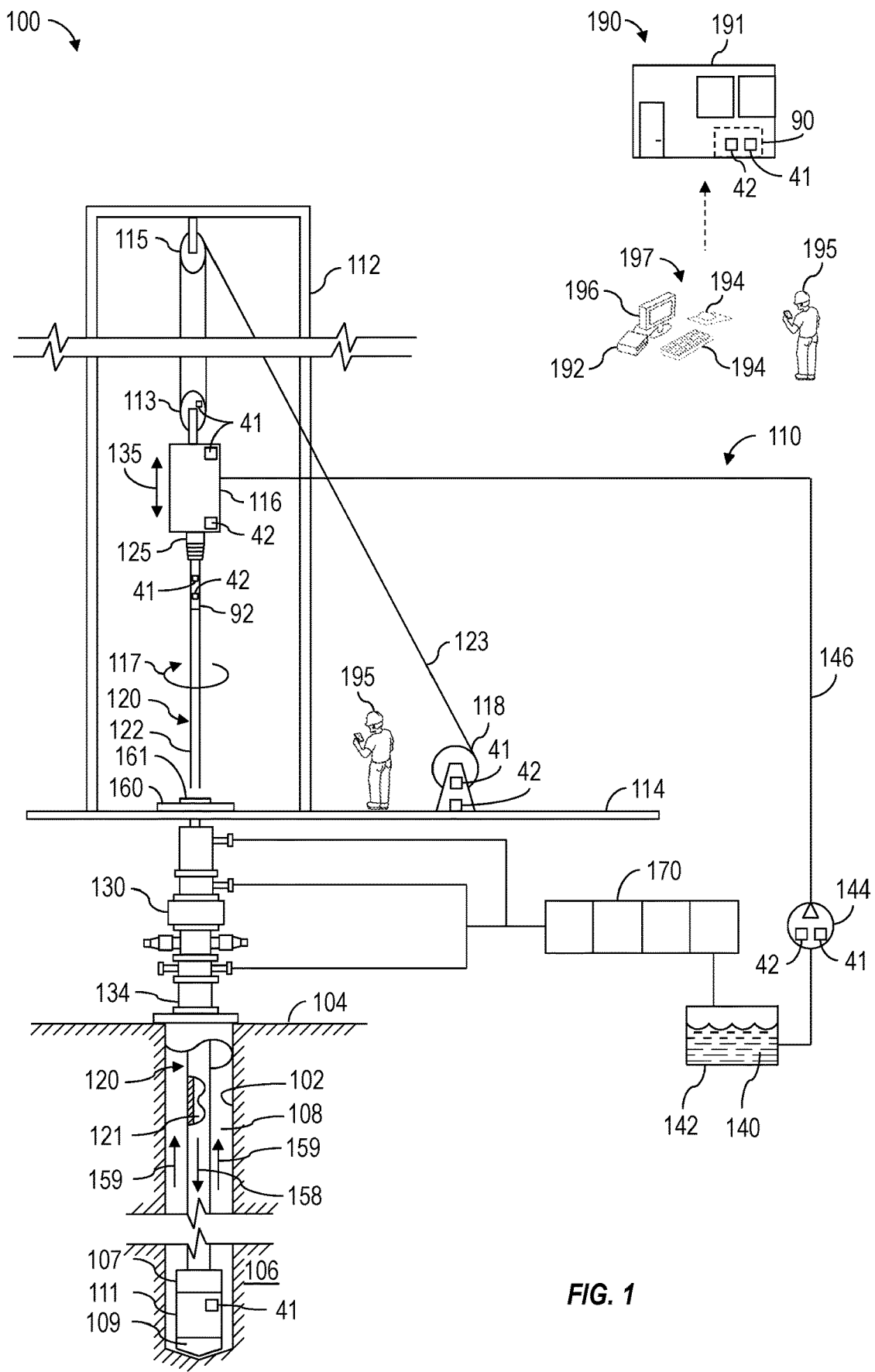
FIG. 1 is a schematic view of at least a portion of an example implementation of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

As described above, torsional waves generated by stick-slip are reflected in the top drive torque readings. The present disclosure generally pertains to estimating oscillations in the revolutions per minute (RPM) of the BHA/bit (hereafter "downhole RPM") based on an effective measure of the top drive torque oscillations. The estimated downhole RPM oscillations may be utilized by drilling personnel for multiple purposes, such as when downhole measurements are often not available. For example, the estimated downhole RPM oscillations may be utilized to gauge severity of actual downhole RPM oscillations and/or surface torque oscillations, which may be utilized to adjust the rotational speed and rate of penetration to improve the downhole RPM oscillations and/or surface torque oscillations. If stick-slip mitigation controls are equipped, the estimated downhole RPM oscillations may further facilitate decisions on when to start and stop the mitigations. The estimated downhole RPM oscillations may also be utilized as a universal standard for performance comparisons between rigs/mitigation control algorithms. The estimated downhole RPM oscillations may also be utilized to render mitigation controls more effective.

The present disclosure also introduces determining an estimated drillstring torque and utilizing the estimated drillstring torque to determine a surface torque oscillation performance index (STOPI) to achieve improved clarity and interpretations. The STOPI can be utilized as an indication of the magnitude and severity of surface torque fluctuations of a drilling rig. The STOPI is determined real-time and updated in a predetermined, short time period, and may then be reported to an external display. The STOPI may provide the ability for a human drilling operator or a computer controller to visualize whether slip-stick oscillations are happening and, if so, mitigate via human and/or computer intervention. Generally, the STOPI is a ratio of: (1) a difference between maximum and minimum surface torque values in a dynamically specified time period via a varying time window; and (2) a configurable constant torque value, such as the rated torque of the top drive. Correspondence between the varying time window and the fundamental frequency of the drillstring may provide a more responsive and, thus, more current result.

Drillstring torque may be estimated by measuring or otherwise obtaining the top drive torque and subtracting a torque equal to a product containing the inertial mass of the top drive and the rotational acceleration of the top drive. The drillstring torque may then be processed as described above for the STOPI. The drillstring torque may be utilized to understand the state of downhole RPM oscillations. The drillstring torque may also be measured directly (rather than estimated) via a device placed at the interface between the top drive and the top of the drillstring. Furthermore, due to the reliability of using drillstring torque to estimate downhole RPM oscillations as well as the STOPI, these determinations (drillstring torque, estimated downhole RPM oscillations, and/or the STOPI) may be utilized as part of mitigation control to determine the mitigation control effort.

FIG. 1 is a schematic view of at least a portion of an example implementation of a well construction system 100 according to one or more aspects of the present disclosure. The well construction system 100 represents an example environment in which one or more aspects of the present disclosure may be implemented. The well construction system 100 may be or comprise a drilling rig and associated wellsite equipment. Although the well construction system 100 is depicted as an onshore implementation, the aspects described below are also applicable to offshore implementations.

The well construction system 100 is depicted in relation to a wellbore 102 formed by rotary and/or directional drilling from a wellsite surface 104 and extending into a subterranean formation 106. The well construction system 100 includes surface equipment 110 located at the wellsite surface 104 and a drill string 120 suspended within the wellbore 102. The surface equipment 110 may include a mast, a derrick, and/or another support structure 112 disposed over an elevated rig floor 114. The drill string 120 may be suspended within the wellbore 102 from the support structure 112. The support structure 112 and the rig floor 114 are collectively supported over the wellbore 102 by legs and/or other support structures (not shown).

The drill string 120 may comprise a bottom-hole assembly (BHA) 107 and means 122 for conveying the BHA 107 within the wellbore 102. The conveyance means 122 may comprise a plurality of individual tubulars, such as drill pipe, drill collars, heavy-weight drill pipe (HWDP), wired drill pipe (WDP), tough logging condition (TLC) pipe, and/or other means for conveying the BHA 107 within the wellbore 102. A downhole end of the BHA 107 may include or be coupled to a drill bit 109. Rotation of the drill bit 109 and the weight of the drill string 120 collectively operate to form the wellbore 102.

The support structure 112 may support a driver, such as a top drive 116, operable to connect (perhaps indirectly) with an upper end of the drill string 120, and to impart rotary motion 117 and vertical motion 135 to the drill string 120, including the drill bit. However, another driver, such as a kelly (not shown) and a rotary table 160, may be utilized in addition to or instead of the top drive 116 to impart the rotary motion 117 to the drill string 120. The top drive 116 and the connected drill string 120 may be suspended from the support structure 112 via a hoisting system or equipment, which may include a traveling block 113, a crown block 115, and a draw works 118 storing a support cable or line 123. The crown block 115 may be connected to or otherwise supported by the support structure 112, and the traveling block 113 may be coupled with the top drive 116. The draw works 118 may be mounted on or otherwise supported by the rig floor 114. The crown block 115 and traveling block 113 comprise pulleys or sheaves around which the support line 123 is received to operatively connect the crown block 115, the traveling block 113, and the draw works 118 (and perhaps an anchor). The draw works 118 may thus selectively impart tension to the support line 123 to lift and lower the top drive 116, resulting in the vertical motion 135. The draw works 118 may comprise a drum, a base, and a prime mover (e.g., an engine or motor) (not shown) operable to drive the drum to rotate and reel in the support line 123, causing the traveling block 113 and the top drive 116 to move upward. The draw works 118 may be operable to reel out the support line 123 via a controlled rotation of the drum, causing the traveling block 113 and the top drive 116 to move downward.

Figure 2:
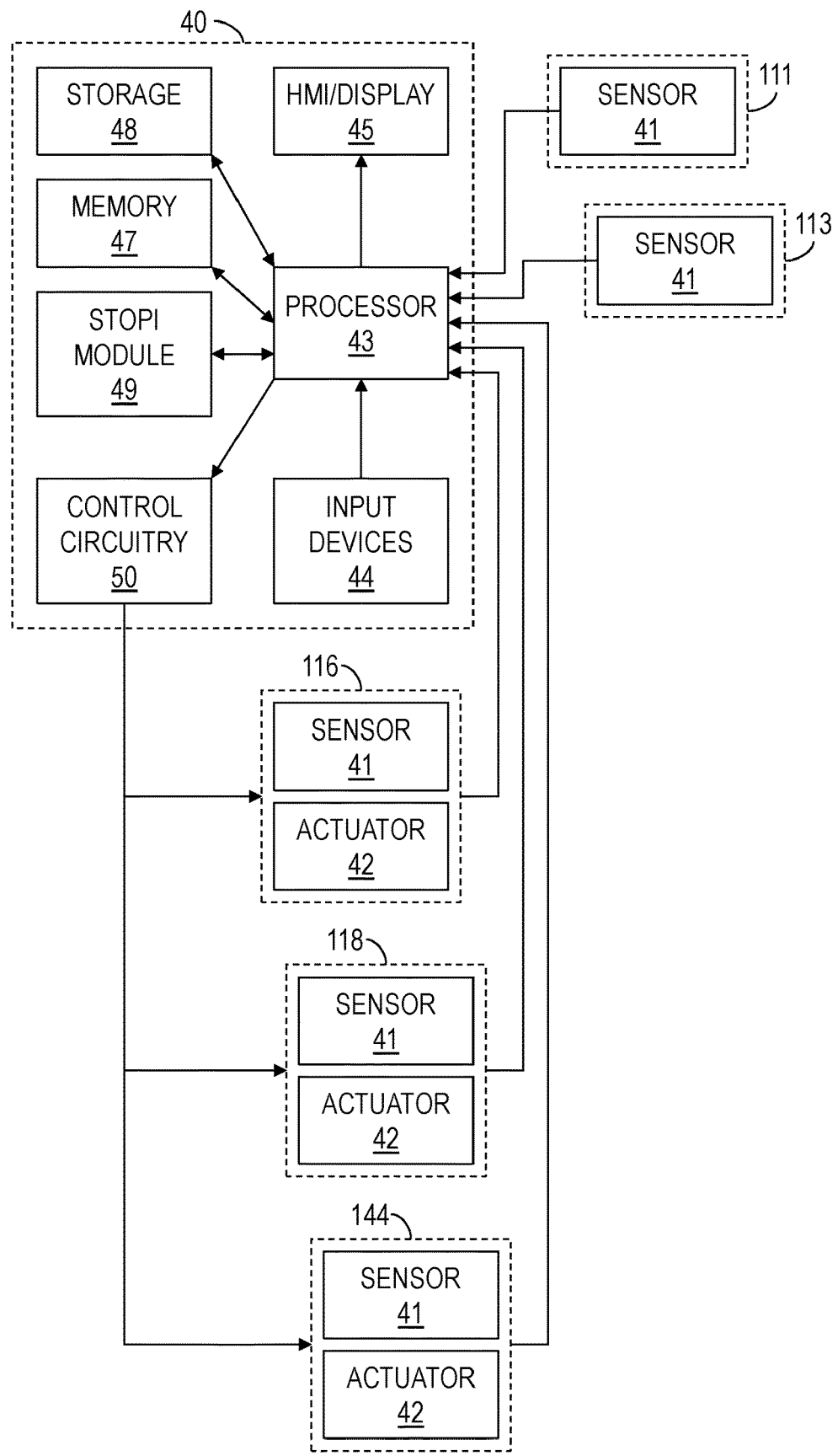
FIG. 2 is a schematic view of at least a portion of an example implementation of apparatus according to one or more aspects of the present disclosure.

The top drive 116 may comprise a drive shaft 125 operatively connected with a prime mover (e.g., a rotary actuator 220, 222 shown in FIG. 2), such as via a gear box or transmission (e.g., gear box 224 shown in FIG. 2). The drive shaft 125 may be selectively coupled with the upper end of the drill string 120 and the prime mover may be selectively operated to rotate the drive shaft 125 and the drill string 120 coupled with the drive shaft 125. Hence, during drilling operations, the top drive 116, in conjunction with operation of the draw works 118, may advance the drill string 120 into the formation 106 to form the wellbore 102. The top drive 116 may have a guide system (not shown), such as rollers that track up and down a guide rail (not shown) on the support structure 112. The guide system may aid in keeping the top drive 116 aligned with the wellbore 102, and in preventing the top drive 116 from rotating during drilling by transferring reactive torque to the support structure 112.

The well construction system 100 may further include a drilling fluid circulation system or equipment operable to circulate fluids between the surface equipment 110 and the drill bit during drilling and other operations. For example, the drilling fluid circulation system may be operable to inject a drilling fluid into the wellbore 102 via an internal fluid passage 121 extending longitudinally through the drill string 120. The drilling fluid circulation system may comprise a pit, a tank, and/or other fluid container 142 holding the drilling fluid (i.e., mud) 140, and a pump 144 operable to move the drilling fluid 140 from the container 142 into the fluid passage 121 of the drill string 120 via a conduit 146 extending from the pump 144 to the top drive 116 and an internal passage (not shown) extending through the top drive 116.

During drilling operations, the drilling fluid may continue to flow downhole through the internal passage 121 of the drill string 120, as indicated by directional arrow 158. The drilling fluid may exit ports (not shown) in the drill bit 109 and then circulate uphole through an annular space 108 ("annulus") of the wellbore 102 defined between an exterior of the drill string 120 and the sidewall of the wellbore 102, such flow being indicated in FIG. 1 by directional arrows 159. In this manner, the drilling fluid lubricates the drill bit and carries formation cuttings uphole to the wellsite surface 104.

The well construction system 100 may further include fluid control equipment 130 for maintaining well pressure control and for controlling fluid being discharged from the wellbore 102. The fluid control equipment 130 may be mounted on top of a wellhead 134. The returning drilling fluid may exit the annulus 108 via one or more valves of the fluid control equipment 130, such as a bell nipple, a rotating control device (RCD), and/or a ported adapter (e.g., a spool, cross adapter, a wing valve, etc.) located below one or more portions of a BOP stack. The returning drilling fluid may then pass through drilling fluid reconditioning equipment 170 to be cleaned and reconditioned before returning to the fluid container 142.

A set of slips 161 may be located on the rig floor 114, such as may accommodate the drill string 120 during tubular make-up and break-out operations, tubular running operations, and the drilling operations. The slips 161 may be in an open position during running and drilling operations to permit advancement of the drill string 120, and in a closed position to clamp the upper end (e.g., uppermost tubular) of the drill string 120 to thereby suspend and prevent advancement of the drill string 120 within the wellbore 102, such as during the make-up and break-out operations.

The surface equipment 110 of the well construction system 100 may also comprise a control center 190 from which various portions of the well construction system 100, such as the top drive 116, the hoisting system (e.g., comprising the drawworks 118), a tubular handling system (e.g., comprising an iron roughneck and/or catwalk, not shown), the drilling fluid circulation system (e.g., comprising the container 142, pump 144, etc.), the well control system (e.g., comprising the fluid control equipment 130), and/or the BHA 107, among other examples, may be monitored and controlled. The control center 190 may be located on the rig floor 114 or another location of the well construction system 100, such as the wellsite surface 104. The control center 190 may comprise a facility 191 (e.g., a room, a cabin, a trailer, etc.) containing a control workstation 197, which may be operated by a human wellsite operator 195 to monitor and control various wellsite equipment or portions of the well construction system 100. The control workstation 197 may comprise or be communicatively connected with a processing device 192 (e.g., a controller, a computer, etc.), such as may be operable to receive, process, and output information to monitor operations of and provide control to one or more portions of the well construction system 100. For example, the processing device 192 may be communicatively connected with the various surface and downhole equipment described herein, and may be operable to receive signals from and transmit signals to such equipment to perform various operations described herein. The processing device 192 may store executable program code, instructions, and/or operational parameters or setpoints, including for implementing one or more aspects of methods and operations described herein. The processing device 192 may be located within and/or outside of the facility 191.

The control workstation 197 may be operable for entering or otherwise communicating control commands to the processing device 192 by the wellsite operator 195, and for displaying or otherwise communicating information from the processing device 192 to the wellsite operator 195. The control workstation 197 may comprise a plurality of human-machine interface (HMI) devices, including one or more input devices 194 (e.g., a keyboard, a mouse, a joystick, a touchscreen, etc.) and one or more output devices 196 (e.g., a video monitor, a touchscreen, a printer, audio speakers, etc.). Communication between the processing device 192, the input and output devices 194, 196, and the various wellsite equipment may be via wired and/or wireless communication means. However, for clarity and ease of understanding, such communication means are not depicted, and a person having ordinary skill in the art will appreciate that such communication means are within the scope of the present disclosure.

Well construction systems within the scope of the present disclosure may include more or fewer components than as described above and depicted in FIG. 1. Additionally, various equipment and/or subsystems of the well construction system 100 shown in FIG. 1 may include more or fewer components than as described above and depicted in FIG. 1. For example, various engines, motors, hydraulics, actuators, valves, and/or other components not explicitly described herein may be included in the well construction system 100, and are within the scope of the present disclosure.

The processing device 192 and/or other portion(s) of the control workstation 197 may be, comprise, or form a portion of a control system according to one or more aspects of the present disclosure. The control system may be utilized to determine whether slip-stick oscillations are occurring. For example, the control system may receive drilling parameter data and drilling performance data related to operations of the well construction system 100. The drilling parameter data and drilling performance data may comprise measurements monitored by a number of sensors 41 placed about the well construction system 100, such as on, in, or in association with the top drive 116 (or a VFD 90 of the top drive 116, such as may be housed in the control center 190, on the rig, or elsewhere), a torque sub 92 coupled between the drill-string 120 and the top drive 116, the drawworks 118, the traveling block 113, the mud pump 144, and a measurement-while-drilling (MWD) module 111 and/or other portion of the BHA 107, among other examples. The sensors 41 may monitor current, voltage, resistivity, torque, weight, force, linear or rotational speed, linear or rotational position, strain, oscillation, and/or other measurements related to drilling parameters or drilling performance. Signals from the sensors 41 may be utilized as input for various algorithms and/or processes according to one or more aspects of the present disclosure, including where aggregated as raw sensor measurements or as scaled engineering values. The control system may receive drilling parameter data and drilling performance data directly from the sensors 41, retrofitted to certain pieces of equipment on the well construction system 100, such that the sensors 41 effectively form part of the well construction system 100. This type of data acquisition may permit higher sampling rates to be utilized by the control system and/or other portion(s) of the control workstation 197, such as for monitoring relevant drilling parameters and drilling performance metrics.

Several components of the well construction system 100 also comprise control actuators 42. For example, the drawworks 118 may comprise an actuator 42 that permits a controller to control the workings of the drawworks 118. The top drive 116 and the mud pump 144 also have actuators 42. The actuators 42 may permit a supervisory controller to control various aspects of the well construction process, such as bit rotation speed, drillstring rotation direction, weight-on-bit (WOB), drilling mud fluid pressure, drilling mud fluid flow rate, and drilling mud density, among other examples.

The actuators 42 may be or comprise electrical motors, hydraulic motors, engines, and/or other means for converting an electrical signal into mechanical motion. The VFD 90 may, thus, also be considered an actuator 42.

FIG. 2 is a schematic view of at least a portion of an example implementation of the control system, designated by reference number 40, and other components of the well construction system 100 according to one or more aspects of the present disclosure. The following description refers to FIGS. 1 and 2, collectively.

The control system 40 may comprise a processor 43 that receive various inputs, such as drilling parameter data and drilling performance data from the sensors 41, as well as inputs from one or more input devices 44, such as the input devices 194. In addition, the processor 43 may be operably coupled to a memory 47 and a storage 48 to execute computer-executable instructions for carrying out one or more aspects of the present disclosure. Such instructions may be encoded in software/hardware programs and modules that may be executed by the processor 43. The computer codes may be stored in a tangible, non-transitory, computer-readable medium (e.g., a hard drive) that at least collectively stores these instructions or routines, such as the memory 47 or the storage 48.

A STOPI module 49 of the control system 40 may comprise hardware and/or software for providing STOPI measurements and determinations. STOPI algorithms therefor may be located in the STOPI module 49 and/or programmable logic controllers (PLCs) that control the actuators 42 of the well construction system 100. The STOPI algorithms may also or instead be implemented in a software layer above the PLC layer. The STOPI module 49 may also be implemented via the processor 43. The STOPI output from the STOPI module 49, and perhaps other output from the processor 43, may be displayed on an HMI and/or other display 45, such as the display 196. Systems and methods according to one or more aspects of the present disclosure that reduce or dampen torsional drillstring vibrations, including slip-stick oscillations and torsional drillstring resonances (e.g., slip-stick mitigation control), may be utilized in conjunction with a control system as disclosed in U.S. Patent Publication No. 2016/0290046, incorporated herein by reference in its entirety.

Figure 3:
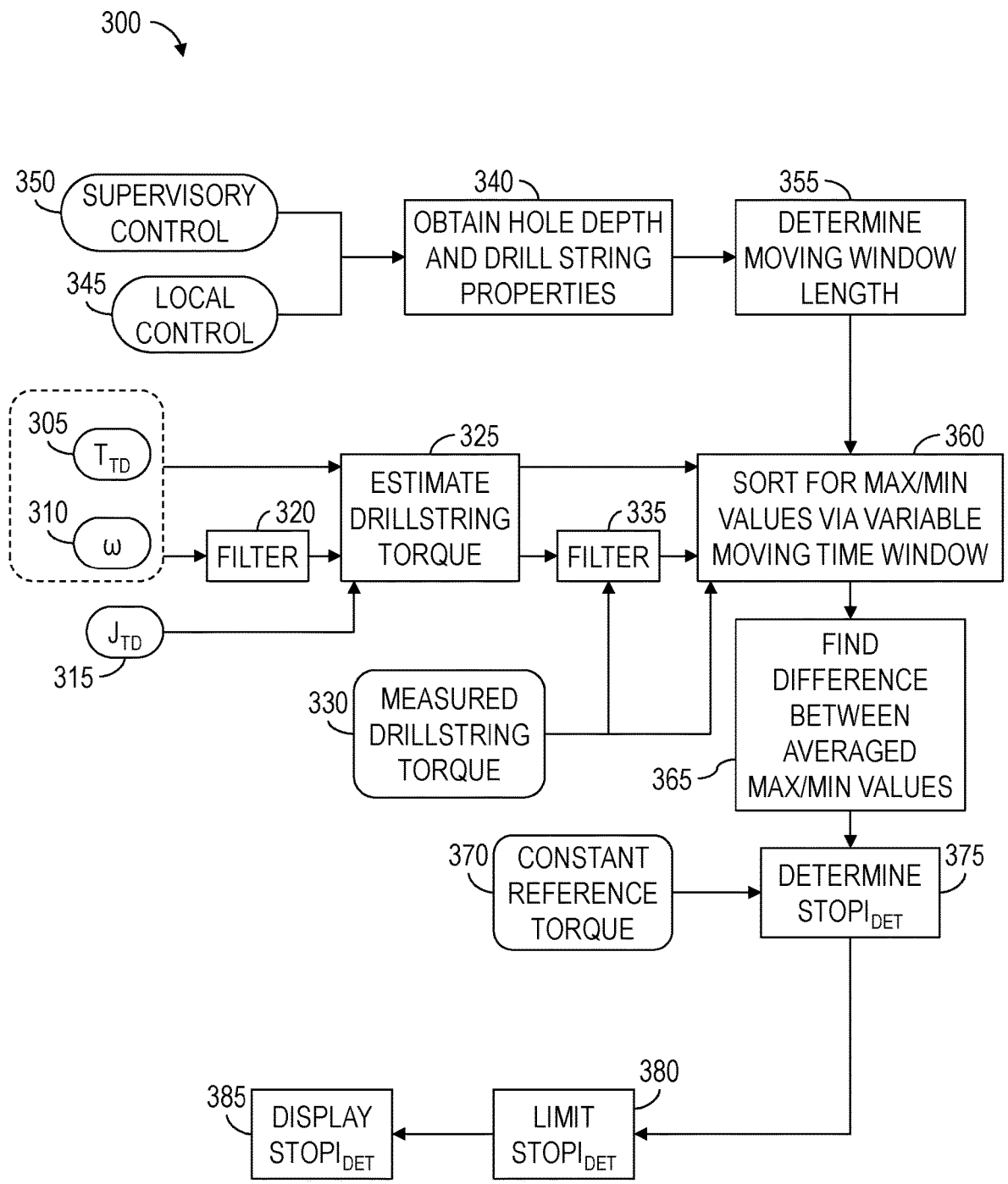
FIG. 3 is a flow-chart diagram of at least a portion of an example implementation of a method according to one or more aspects of the present disclosure.

FIG. 3 is a flow-chart diagram of at least a portion of an example implementation of an algorithm 300 for generating STOPI according to one or more aspects of the present disclosure. The algorithm 300 includes obtaining 305 raw surface data for present values of drillstring/top drive torque ($T_{TD}$), obtaining 310 raw surface data for present values of drillstring/top drive rotational speed ($\omega$), and obtaining 315 surface data for present values of top drive inertia ($J_{TD}$). The raw surface torque and speed data may be obtained 305, 310 from the sensor(s) 41 of the top drive 116, the VFD 90 of/related to the top drive 116, and/or the torque sub 92. The top drive inertia may be obtained 315 utilizing known equations, known physical characteristics of the top drive 116, and the obtained 310 rotational speed data. The top drive inertia may also be measured and calculated through engineering tests, such as the known chirp test, or a series of tests on different RPM frequencies, or by other methods.

The obtained 305 raw surface torque data and the obtained 310 raw speed data may then be filtered 320 to obtain filtered surface torque data ($T_{TD\text{-}f}$) and filtered surface speed data ($\omega_f$). Such filtering 320 may include low-pass and/or band-pass filtering, with the corresponding cutoff frequencies being predetermined fixed values. For example, if the formation 106 to be drilled is known to be fairly constant, then the filtering 320 may generally comprise low-pass filtering, else the filtering 320 may instead generally comprise band-pass filtering.

The drillstring torque $T_{ST}$ may be estimated 325 from the filtered torque data ($T_{TD\text{-}f}$), the filtered speed data ($\omega_f$), and the top drive inertia data ($J_{TD}$). Such estimate 325 may utilize Equation (1) set forth below, for example.

$$T_{ST} = T_{TD\text{-}f} J_{TD} \alpha_{TD} \qquad (1)$$

where $\alpha_{TD}$ is the rotational acceleration of the top drive, such as may be determined utilizing Equation (2) set forth below.

$$\alpha_{TD} = \frac{\omega_2 - \omega_1}{dt} \qquad (2)$$

where $\omega_1$ and $\omega_2$ denote filtered rotational speed measured at two (perhaps temporally-neighboring) times and dt is the time interval between the two measurements.

The estimated 325 drillstring torque $T_{ST}$ may be used on its own, or it can be used to determine a STOPI parameter as described below. Measured drillstring torque may also be obtained 330 and utilized for the STOPI parameter determination. In either scenario, the estimated 325 drillstring torque $T_{ST}$ or the measured drillstring torque may be filtered 335. Such filtering 335 may include low-pass and/or band-pass filtering, with the corresponding cutoff frequencies being predetermined fixed values. For example, if the formation 106 to be drilled is known to be fairly constant, then the filtering 335 may generally comprise low-pass filtering, else the filtering 335 may instead generally comprise band-pass filtering.

Determining the STOPI parameter may include obtaining 340 drillstring length (hole depth) and drillstring properties from either local control 345 or supervisory control 350 at a higher level of a hierarchical control network. A moving window length may then be determined 355, such as by estimating a fundamental oscillation time period $T_1$. Various known and/or future-developed techniques may be utilized to determine the fundamental oscillation time period $T_1$. For example, the fundamental oscillation time period $T_1$ may be determined utilizing equations from A. Kyllinstad and G. W. Halsey, "A Study of Slip/Stick Motion of the Bit," SPE Drilling Engineering, pgs. 369-373, December 1988, incorporated herein in its entirety, such as Equations (3)-(5) set forth below.

$$J = \frac{\rho I_1 L_1}{3} + \rho I_2 L_2 \qquad (3)$$

$$K = G\frac{I_1}{L_1} \qquad (4)$$

$$T_1 = 2\pi/\sqrt{K/J} \qquad (5)$$

where J is the moment of inertia of the drillstring, $\rho$ is density of the drillstring, $I_1$ is the cross-sectional polar moment of the drillstring pipes, $I_2$ is the cross-sectional polar moment of the drillstring collars, $L_1$ is the length of the drillstring pipes, $L_2$ is the length of the drillstring collars, K is the torsional stiffness of the drillstring, G is the shear modulus of the drillstring material, and $\sqrt{K/J}$ is the angular eigen frequency. However, other methods for obtaining the fundamental oscillation time period $T_1$ are also within the scope of the present disclosure.

Equation (6) set forth below may be utilized to determine 355 the total time interval $T_T$ over which the moving window will move.

$$T_T = \beta T_1 \qquad (6)$$

where $\beta$ is a predetermined safety factor between 1.0 and 2.0 utilized to ensure the moving window covers a full cycle of oscillation at the time. Based on $T_T$, the length T of the moving window can be determined by dividing the control system sampling time $\Delta T$ with $T_T$. The window length T may then rounded to be an integer.

The determined 355 moving window length is then utilized to sort 360 the stored torque value array to obtain the p largest values and the q lowest values, where p and q are predetermined, positive integers. The difference between the average of the p largest values and the average of the q lowest values is then determined 365. The determined 365 difference provides an amplitude of torsional fluctuations, which is divided by an obtained 370 constant reference torque to determine 375 the STOPI parameter $STOPI_{DET}$. The obtained 370 constant reference torque may be the rated torque of the top drive 116, an off-bottom torque, or an at-bottom torque, among other examples. Off-bottom torque is measured by rotating off bottom with no WOB. At-bottom torque is measured by rotating on bottom with some WOB. Obtaining 370 the constant reference torque may be based on availability and/or the choice of rig personnel.

The determined 375 $STOPI_{DET}$ may also be limited 380 between predetermined, configurable maximum and minimum values. The estimated 325 drillstring torque and/or the limited 380 $STOPI_{DET}$ may then be displayed 385, such as on the display 196 shown in FIG. 1, the display 45 shown in FIG. 2, the output device 428 described below in reference to FIG. 7, and/or other display devices. The display update time is generally longer than the control system sampling time $\Delta T$. Therefore, either a polling method or the average value may be utilized for the purpose of the display 385.

The method 300 may be executed while STOPI determination is enabled (i.e., turned on). When the STOPI determination is disabled based on preset conditions (such as bit not at bottom, TD speed setpoint changes, and drilling controller off), a null value or a high mark integer value may be assigned to STOPI for logging, which also clarifies the disabled status without being misleading.

Figure 4:
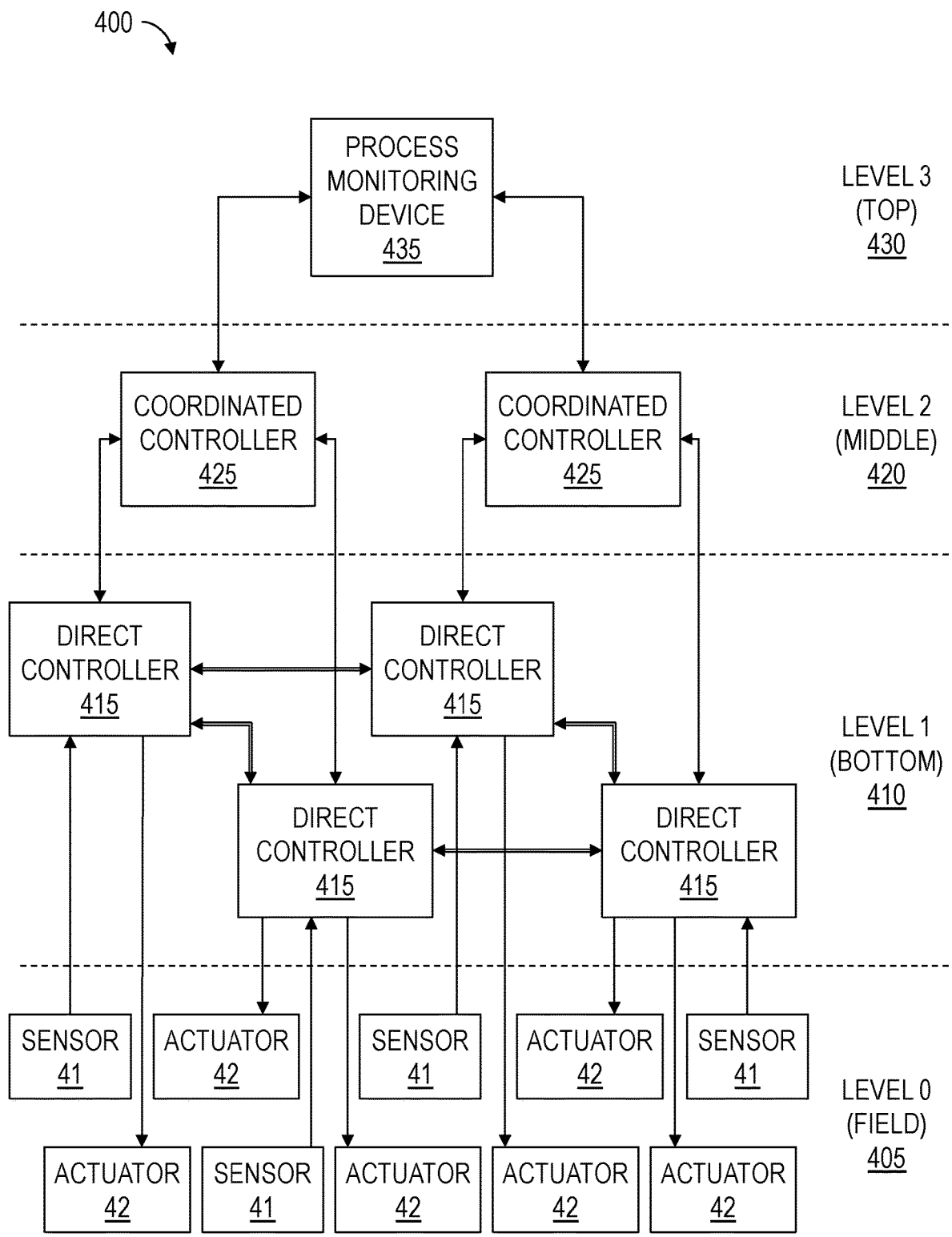
FIG. 4 is a schematic view of at least a portion of an example implementation of apparatus according to one or more aspects of the present disclosure.

The method 300 may be implemented as part of the rig control system. For example, FIG. 4 is a schematic view of at least a portion of an example implementation 400 of the rig control system described above, including the depiction of control levels for the rig control system 400. The control levels differ in the degree to which software programs or algorithms may be edited or reprogrammed after the original software programs or algorithms have been embedded in the hardware. The levels also differ in the speed of communications between devices at the control level.

Level 0 (Field) 405 comprises the sensors 41 and actuators 42 for a variety of drilling subsystems. Example subsystems include a drilling fluid circulation system (which may include mud pumps 144, valves, fluid reconditioning equipment (142, 170), etc.), a rig control system (which may include hoisting equipment (drawworks 118), drillstring rotary mover equipment (such as a top drive 116 and/or rotary table 160), a pipe-handling manipulator, a catwalk, etc.), a managed pressure drilling system, a cementing system, a rig walk system, etc. Level 0 (Field) 405 may comprise a high-speed controller, such as of a VFD 90. Level 0 (Field) 405 hardware devices may be programmed with software by the manufacturer and the software may be less suitable for modification unless performed by the manufacturer.

Level 1 (Bottom) 410 comprises direct control devices 415 for directly controlling the hardware/subsystems of Level 0 (Field) 405. Double-line arrows depicted in FIG. 4 in Level 1 (Bottom) 410 are included solely to distinguish from single-line arrows. The Level 1 (Bottom) direct controllers 415 can include programmable logic controllers (PLCs), processors, industrial computers, personal computer based controllers, soft PLCs, the like, and/or other controllers configured and operable to receive sensor data from subsystem sensors 41 and/or transmit control instructions to the actuators 42 and other subsystem equipment. The Level 1 (Bottom) direct controllers 415 may be, comprise, or be implemented by one or more processors of various types operable in the local application environment, and may include one or more general-purpose processors, special-purpose processors, microprocessors, digital signal processors (DSPs), field-programmable gate arrays (FPGAs), application-specific integrated circuits (ASICs), processors based on a multi-core processor architecture, and/or other processors. Examples include one or more INTEL microprocessors, microcontrollers from the ARM and/or PICO families of microcontrollers, embedded soft/hard processors in one or more FPGAs, etc. Sensors 41 and various other components may transmit sensor data and/or status data to a direct controller 415, and the actuators 42 and other controllable components of the Level 0 (Field) 405 may receive commands from a direct controller 415 to control operations of the controllable components. One or more aspects disclosed herein may also permit communication between direct controllers 415 of different subsystems through virtual networks. Sensor data and/or status data may be communicated through virtual networks and a common data bus between direct controllers of different subsystems. The Level 1 (Bottom) 410 direct controllers 415 may be programmed and deployed, but with relative difficulty. Programmed software may thereafter be configured and edited, but with relative difficulty. Just very rigid computer programming may be possible. A field bus may be used to communicate with the direct controllers 415 of the Level 1

(Bottom) 410 via protocols, such as Ethernet CAT, Profi-NET, ProfiBus, Modbus, etc. Processor 43 shown is FIG. 2 is an example of a Level 1 (Bottom) 410 direct controller 415.

Level 2 (Middle) 420 comprises coordinated controllers 425. These may include a variety of computing devices, such as computers, processors, domain controllers, PLCs, industrial computers, personal computers, soft PLCs, the like, and/or other controllers configured and operable to receive information and data available on a network of Level 2 (Middle) 420, and transmit control commands and instructions to the direct controllers 415 at Level 1 (Bottom) 410. The coordinated controllers 425 of Level 2 (Middle) 420 may be, comprise, or be implemented by one or more processors of various types operable in the local application environment, and may include one or more general-purpose processors, special-purpose processors, microprocessors, DSPs, FPGAs, ASICs, processors based on a multi-core processor architecture, and/or other processors. Examples include one or more INTEL microprocessors, microcontrollers from the ARM and/or PICO families of microcontrollers, embedded soft/hard processors in one or more FPGAs, etc. The coordinated controllers 425 may be programmed and deployed relatively easily because, for example, high-level programming languages, such as C/C++, may be used with software program running in a real-time operating system. A real-time communication data bus may be utilized to communicate with the coordinated controllers 425 via various protocols, such as TCP/IP and UDP.

Level 3 (Top) 430 comprises process monitoring devices 435 that do not control but merely monitor activity and provide information to the controlling devices at lower levels. Various known and/or future-developed computing devices may perform the functions of Level 3 (Top) 430.

A control system implementing the method 300 depicted in FIG. 3, or at least portions thereof) may be implemented in/as a PLC or other direct controller 415 at Level 1 (Bottom) 410, an industrial PC running a real-time operating system or other coordinated controller 425 at Level 2 (Middle) 420, or a server computer or virtual machine at any level. Typically, the method 300 may be implemented either on PLCs at Level 1 (Bottom) 410 or in a middleware software layer at Level 2 (Middle) 420. A supervisory controller that may implement mitigation slip-stick controls may be implemented either in a middleware software layer at Level 2 (Middle) 420 or at Level 3 (Top) 430.

Figure 5:
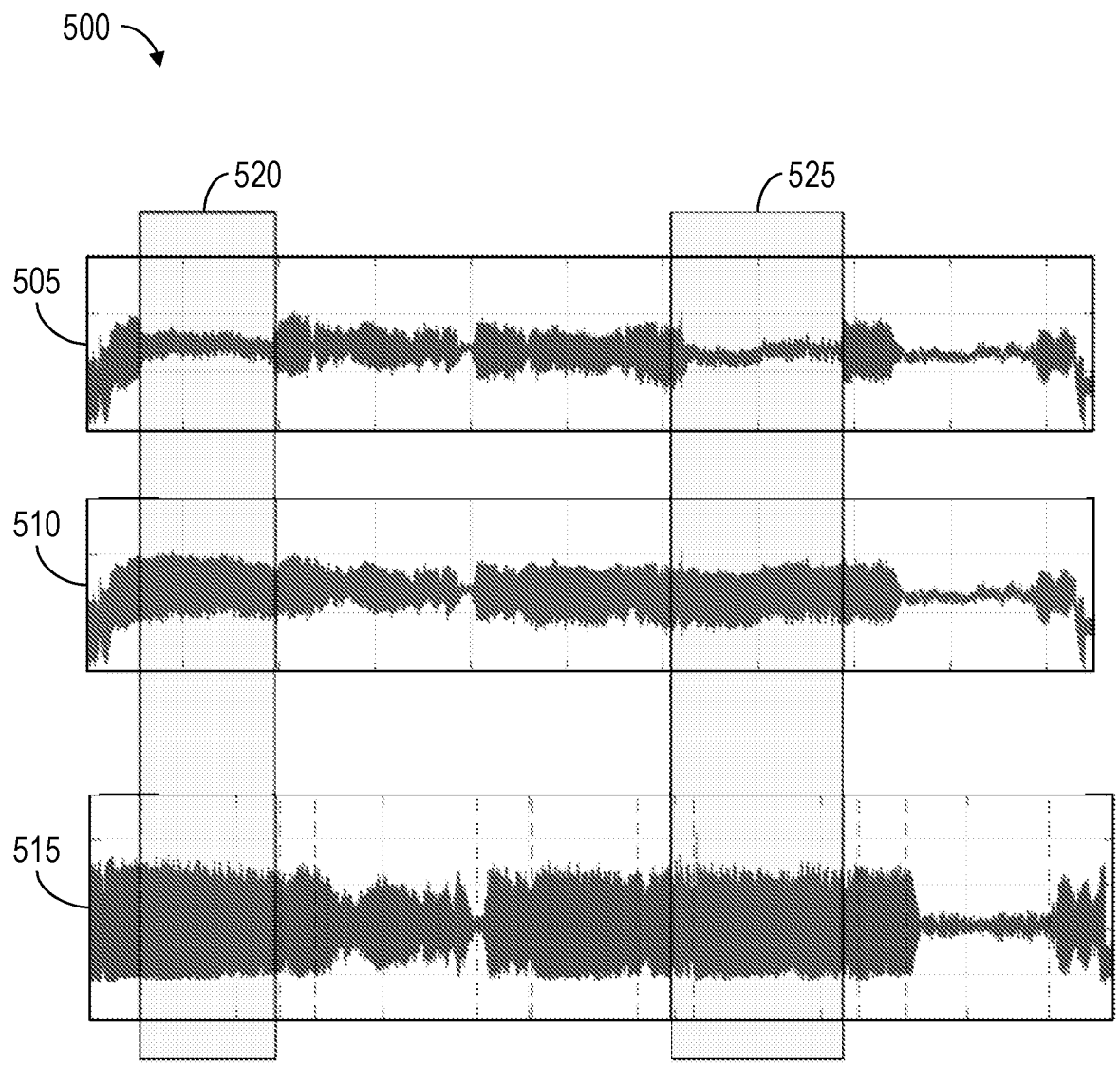
FIGS. 5 and 6 are graphs related to one or more aspects of the present disclosure.

FIG. 5 is a graph 500 depicting an example difference between top drive torque and estimated drillstring torque (e.g., with respect to time) according to one or more aspects of the present disclosure. The upper subplot 505 presents top drive torque, the middle subplot 510 presents the related drillstring torque estimate, and the lower subplot 515 presents the related downhole RPM, each from a field test of an example stick-slip mitigation system according to one or more aspects of the present disclosure. Two highlighted time periods 520, 525 indicate when the top drive torque 505 has low levels of oscillations, implying that stick-slip is not occurring. However, in the same periods 520, 525, the drillstring torque estimate 510 indicates high levels of oscillations, as does the downhole measurement of RPM 515. Thus, the drillstring torque estimate 510 appears to better characterize downhole stick-slip using surface measurements, relative to the top drive torque 505.

Figure 6:
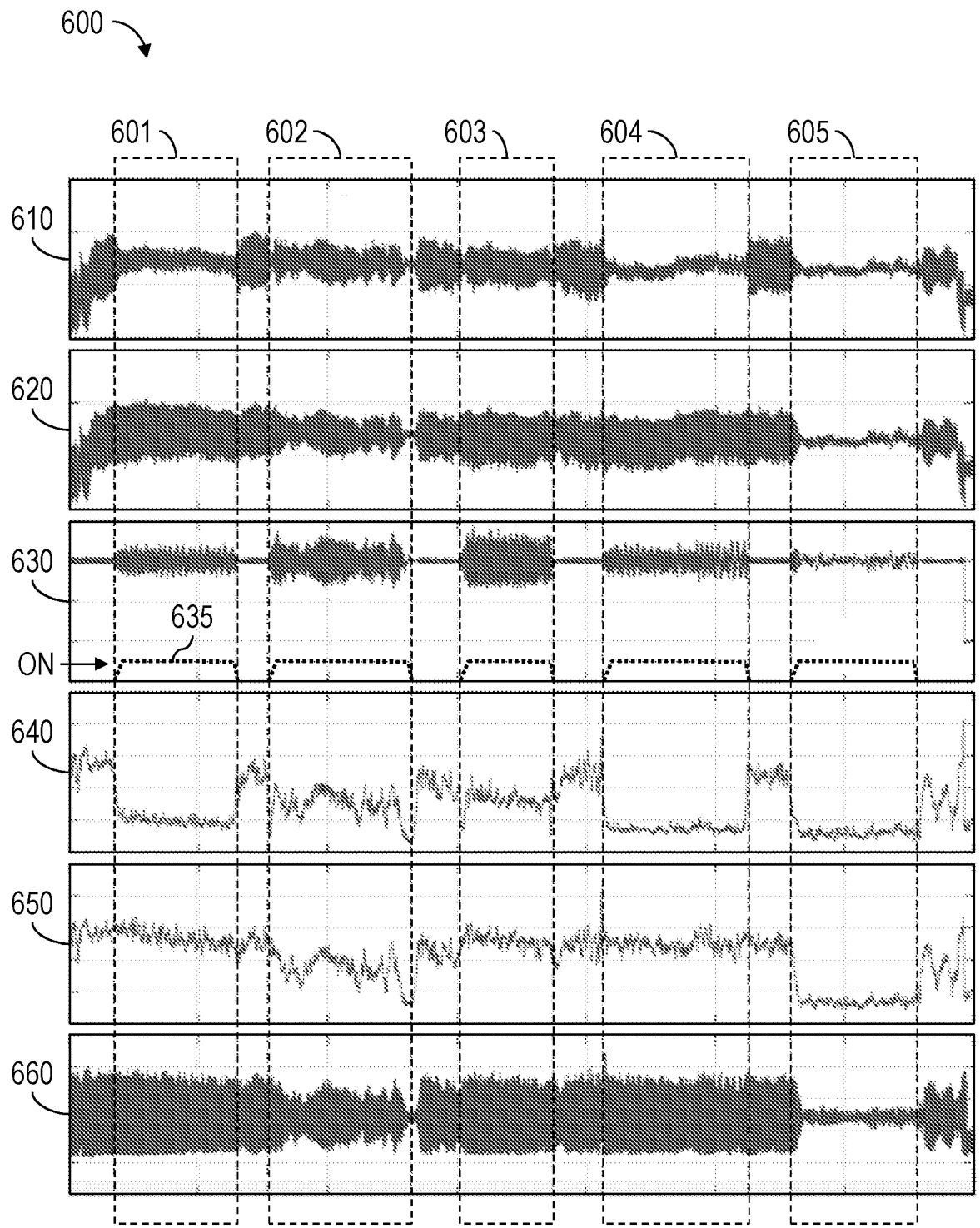

FIG. 6 is a graph 600 depicting the difference between determining the STOPI on surface-measured top drive torque versus estimated drillstring torque according to one or more aspects of the present disclosure. The upper subplot 610 shows the top drive torque from a field trial of an example stick-slip mitigation technique according to one or more aspects of the present disclosure, including cases 601-605. Subplot 620 shows the estimated drillstring torque. Subplot 630 shows the rotational speed. Subplot 630 also shows the on-off status 635 of the stick-slip mitigation controls. Subplot 640 shows STOPI values based on the surface-measured top drive torque, and subplot 650 shows STOPI values based on drillstring torque estimated according to one or more aspects of the present disclosure. In cases 601, 603, and 605, the decreased level of torsional vibrations of the STOPI values 640 based on surface top drive torque imply that stick-slip has been successfully mitigated (lower level of torsional vibrations). However, in cases 601 and 603, the STOPI values 650 based on estimated drill string torque do not show a corresponding decrease in torsional vibrations. This is confirmed by subplot 660 showing measured bit RPM values. Thus, just in case 605 was the downhole stick-slip mitigated. This real data example demonstrates that the STOPI determination based on estimated drillstring torque according to one or more aspects of the present disclosure provides reliable and consistent (with downhole RPM) torque oscillation measures.

The drillstring torque estimate determined according to one or more aspects of the present disclosure, and/or the STOPI determined utilizing the estimated drillstring torque according to one or more aspects of the present disclosure, can be utilized to mitigate stick-slip. For example, onsite and/or real-time inspection of the drillstring torque estimate, and/or the STOPI determined therewith, can be utilized to recognize stick-slip. The drillstring torque estimate and/or the STOPI determined therewith may also be utilized to determine actions for mitigating stick-slip, such as by lowering WOB, increasing top drive RPM, and/or activating top drive control measures. The drillstring torque estimate and/or the STOPI determined therewith may also be utilized to determine whether mitigation measures are improving stick-slip. The drillstring torque estimate and/or the STOPI determined therewith may also be utilized to modify mitigation measures to improve drilling performance (e.g., improve rate of penetration), such as by modifying WOB, modifying top drive RPM, and/or modifying top drive control parameters. Determination of the drillstring torque estimate and/or the STOPI determined therewith, as well as the mitigation actions described above, may also be repeated until stick-slip is satisfactorily mitigated. Such process may be achieved via a human operator or an automated system. Such automated system may be, comprise, or be included in the control center 190 and/or control workstation 197 shown in FIG. 1, the control system 40 shown in FIG. 2, and/or other processing systems within the scope of the present disclosure.

Figure 7:
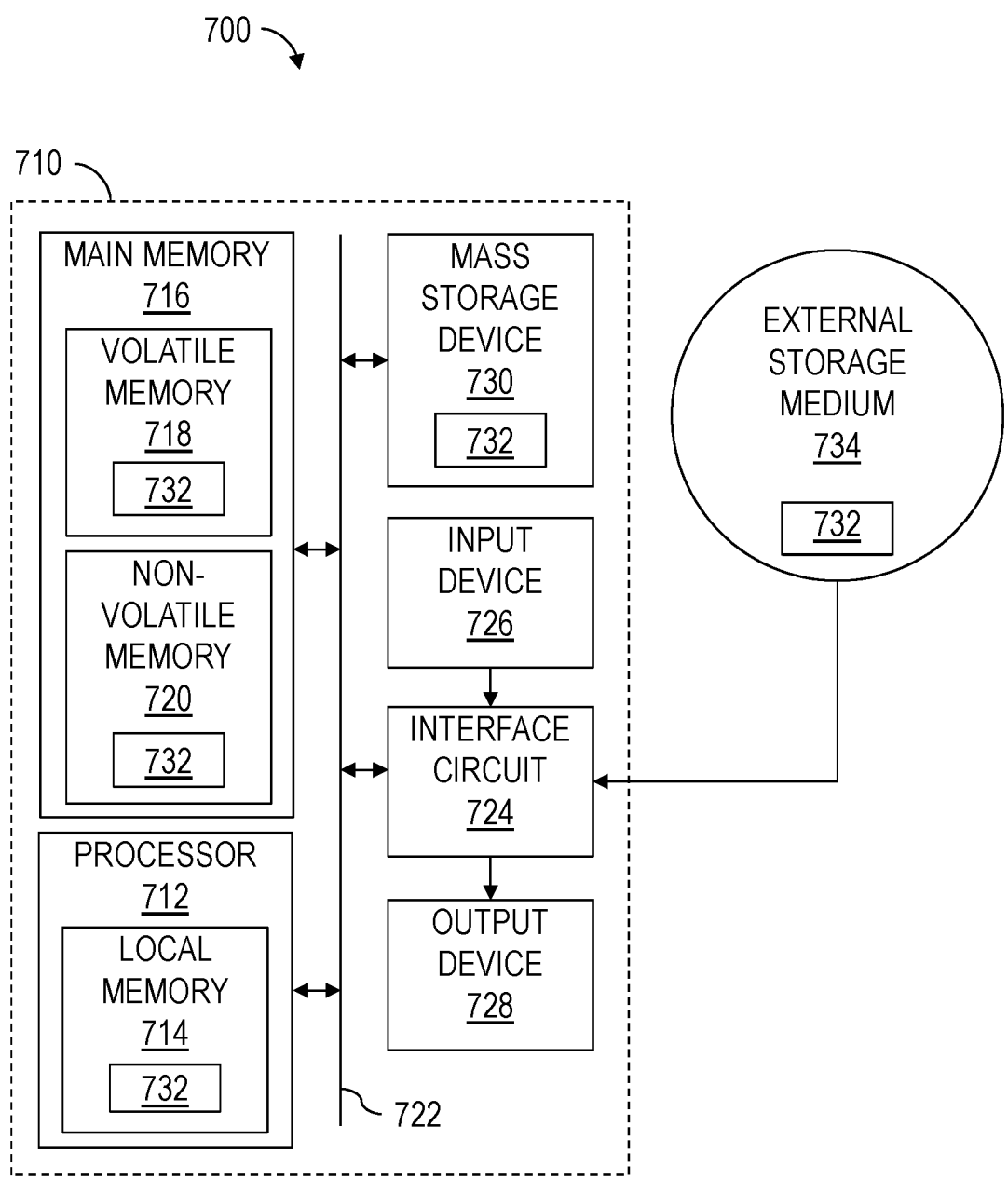
FIG. 7 is a schematic view of at least a portion of an example implementation of apparatus according to one or more aspects of the present disclosure.

FIG. 7 is a schematic view of at least a portion of an example implementation of such an automated system, designated in FIG. 7 as processing system 700. One or more instances of the processing system 700, or at least portions thereof, may also implement one or more of the direct controllers 415, coordinated controllers 425, and/or process monitoring device 435 shown in FIG. 4, as well as other processing devices also within the scope of the present disclosure.

The processing system 700 may include a controller 710 that may be or comprise, for example, one or more processors, special-purpose computing devices, servers, personal computers, personal digital assistant (PDA) devices, smartphones, internet appliances, and/or other types of computing devices. The controller 310 may comprise a processor 712, such as a general-purpose programmable processor. The processor 712 may comprise a local memory 714 and may execute coded instructions 732 present in the local memory 714 and/or another memory device. The processor 712 may execute, among other things, machine-readable instructions or programs to implement the example methods and/or processes described herein. The programs stored in the local memory 714 may include program instructions or computer program code that, when executed by an associated processor, facilitate the drillstring torque estimation and/or STOPI determination methods and/or processes described herein. The processor 712 may be, comprise, or be implemented by one or more processors of various types suitable to the local application environment, and may include one or more of general-purpose computers, special-purpose computers, microprocessors, DSPs, FPGAs, ASICs, and processors based on a multi-core processor architecture, as non-limiting examples. Of course, other processors from other families are also appropriate.

The processor 712 may be in communication with a main memory 716, such as may include a volatile memory 718 and a non-volatile memory 720, perhaps via a bus 722 and/or other communication means. The volatile memory 718 may be, comprise, or be implemented by random-access memory (RAM), static RAM (SRAM), dynamic RAM (DRAM), synchronous DRAM (SDRAM), RAMBUS DRAM (RDRAM), and/or other types of RAM devices. The non-volatile memory 720 may be, comprise, or be implemented by read-only memory, flash memory, and/or other types of memory devices. One or more memory controllers (not shown) may control access to the volatile memory 718 and/or non-volatile memory 720. The controller 710 may be operable to store or record information entered by the wellsite operator 195 and/or information generated by the sensors 41 and actuators/controlled components 42 on the main memory 717.

The controller 710 may also comprise an interface circuit 724. The interface circuit 724 may be, comprise, or be implemented by various types of standard interfaces, such as an Ethernet interface, a universal serial bus (USB), a third-generation input/output (3GIO) interface, a wireless interface, and/or a cellular interface, among others. The interface circuit 724 may also comprise a graphics driver card. The interface circuit 724 may also comprise a communication device, such as a modem or network interface card to facilitate exchange of data with external computing devices via a network (e.g., Ethernet connection, digital subscriber line (DSL), telephone line, coaxial cable, cellular telephone system, satellite, etc.). One or more of the sensors 41 and actuators/controlled components 42 may be connected with the controller 710 via the interface circuit 724, such as may facilitate communication between the sensors 41 and actuators/controlled components 42 and the controller 710.

One or more input devices 726 may also be connected to the interface circuit 724. The input devices 726 may permit the wellsite operator 159 to enter the coded instructions 732, operational target set-points, and/or other data into the processor 712. The input devices 726 may be, comprise, or be implemented by a keyboard, a mouse, a touchscreen, a track-pad, a trackball, an isopoint, and/or a voice recognition system, among other examples. One or more output devices 728 may also be connected to the interface circuit 724. The output devices 728 may be, comprise, or be implemented by display devices (e.g., a liquid crystal display (LCD) or cathode ray tube display (CRT)), printers, and/or speakers, among other examples. The controller 710 may also communicate with one or more mass storage devices 730 and/or a removable storage medium 734, such as may be or include floppy disk drives, hard drive disks, compact disk (CD) drives, digital versatile disk (DVD) drives, and/or USB and/or other flash drives, among other examples.

The coded instructions 732, the operational target set-points, and/or other data may be stored in the mass storage device 730, the main memory 716, the local memory 714, and/or the removable storage medium 734. Thus, the controller 710 may be implemented in accordance with hardware (perhaps implemented in one or more chips including an integrated circuit, such as an ASIC), or may be implemented as software or firmware for execution by the processor 712. In the case of firmware or software, the implementation may be provided as a computer program product including a computer-readable medium or storage structure embodying computer program code (i.e., software or firmware) thereon for execution by the processor 712.

In view of the entirety of the present disclosure, including the figures and the claims, a person having ordinary skill in the art will readily recognize that the present disclosure introduces a method comprising: obtaining raw surface data for present values of torque ($T_{TD}$) generated by a top drive operably coupled with a drillstring; obtaining raw surface data for present values of rotational speed ($\omega$) of the top drive corresponding to the $T_{TD}$; obtaining inertia ($J_{TD}$) of the top drive; and estimating torque $T_{ST}$ of the drillstring based on the obtained $T_{TD}$ data, the obtained $\omega$ data, and the obtained $J_{TD}$ data.

The $T_{TD}$ data may be obtained from a sensor associated with the top drive, a VFD related to the top drive, and/or a torque sub disposed between the drillstring and the top drive.

The method may further comprise: filtering the obtained $T_{TD}$ data to obtain filtered $T_{TD}$ ($T_{TD-f}$) data; and filtering the obtained $\omega$ data to obtain filtered $\omega$ ($\omega_f$) data; wherein estimating the $T_{ST}$ may be based on the filtered $T_{TD-f}$ data, the filtered $\omega_f$ data, and the obtained $J_{TD}$ data. Filtering the obtained $T_{TD}$ data and the obtained $\omega$ data may be: low-pass filtering with predetermined, low-pass frequencies if a formation being drilled via operation of the top drive has a substantially constant composition; else band-pass filtering with predetermined, band-pass frequencies.

The method may further comprise: filtering the obtained $T_{TD}$ data to obtain filtered $T_{TD}(T_{TD-f})$ data; and filtering the obtained $\omega$ data to obtain filtered $\omega$ ($\omega_f$) data; wherein estimating the $T_{ST}$ may be based on the filtered $T_{TD-f}$ data, the filtered $\omega_f$ data, and the $J_{TD}$ data. Estimating the $T_{ST}$ may be via Equation (1) set forth above. The acceleration am may be determined by Equation (2) set forth above.

The method may comprise utilizing the estimated drillstring torque $T_{ST}$ to determine a STOPI. Determining the STOPI may comprise: obtaining drillstring properties; determining a moving window length (T); utilizing the determined moving window length to sort the obtained $T_{TD}$ data to obtain a number (p) of largest values and a number (q) of lowest values, wherein p and q are predetermined, positive integers; determining a difference between an average of the p largest values and an average of the q lowest values; and determining the STOPI as a ratio of (i) the determined difference between the average of the p largest values and the average of the q lowest values and (ii) a constant reference torque. Determining the moving window length may comprise estimating a fundamental oscillation time period ($T_1$). Estimating the $T_1$ may be based on moment of inertia (J) of the drillstring, density (ρ) of the drillstring, cross-sectional polar moments (I) of components of the drillstring, lengths (L) of the drillstring components, torsional stiffness (K) of the drillstring, and shear modulus (G) of material forming the drillstring. Estimating the $T_1$ may be based on Equations (3)-(5) set forth above. Determining the moving window length (T) may utilizes $T_T = \beta T_1$, where $T_T$ is the total interval over which the moving window is moved, and where β is a predetermined safety factor between 1.0 and 2.0 configured to ensure the moving window covers a full cycle of oscillation; and determining the moving window length (T) may comprise rounding, to an integer, a ratio of: a sampling time (ΔT) utilized for obtaining the $T_{TD}$ data; to $T_T$. The determined difference between the average of the p largest values and the average of the q lowest values may provide an amplitude of torsional fluctuations. The constant reference torque may be rated torque of the top drive, an off-bottom torque, or an at-bottom torque. Determining the STOPI may further comprise limiting the ratio between predetermined, configurable maximum and minimum values. The method may comprise displaying to a human operator at least one of: the estimated drillstring torque $T_{ST}$; and the determined STOPI. The method may comprise providing at least one of the estimated drillstring torque $T_{ST}$ and the determined STOPI to a controller operable to automatically initiate an action based thereon.

The method may comprise displaying the estimated drillstring torque $T_{ST}$ to a human operator.

The method may comprise providing the estimated drillstring torque $T_{ST}$ to a controller operable to automatically initiate an action based thereon.

The present disclosure also introduces an apparatus comprising: a first sensor operable for obtaining raw surface data for present values of torque ($T_{TD}$) generated by a top drive operably coupled with a drillstring; a second sensor operable for obtaining raw surface data for present values of rotational speed (ω) of the top drive corresponding to the $T_{TD}$; and a processing device comprising a processor and a memory storing computer program code, wherein the processing device is operable to obtain inertia ($J_{TD}$) of the top drive and estimate torque $T_{ST}$ of the drillstring based on the obtained $T_{TD}$ data, the obtained co data, and the obtained $J_{TD}$ data.

The processing device may be operable to display the estimated drillstring torque $T_{ST}$ to a human operator.

The processing device may be operable to provide the estimated drillstring torque $T_{ST}$ to a controller operable to automatically initiate an action based thereon.

The processing device may be operable to automatically initiate an action based on the estimated drillstring torque $T_{ST}$.

The processing device may be operable to utilize the estimated drillstring torque $T_{ST}$ to determine a STOPI. The processing device may be operable to display to a human operator at least one of the estimated drillstring torque $T_{ST}$ and the determined STOPI. The processing device may be operable to provide at least one of the estimated drillstring torque $T_{ST}$ and the determined STOPI to a controller operable to automatically initiate an action based thereon. The processing device may be operable to automatically initiate an action based on at least one of the estimated drillstring torque $T_{ST}$ and the determined STOPI.

The apparatus may comprise the top drive.

Other aspects of the apparatus may be as described above. The apparatus may also comprise other components as described above.

The present disclosure also introduces a computer program product comprising a non-transitory, computer-readable medium having instructions recorded thereon that, when executed by a processing device having a processor and a memory, cause the processing device to: obtain raw surface data for present values of torque ($T_{TD}$) generated by a top drive operably coupled with a drillstring; obtain raw surface data for present values of rotational speed (ω) of the top drive corresponding to the $T_{TD}$; obtain inertia ($J_{TD}$) of the top drive; and estimate torque $T_{ST}$ of the drillstring based on the obtained $T_{TD}$ data, the obtained co data, and the obtained $J_{TD}$ data.

The instructions may further cause the processing device to display the estimated drillstring torque $T_{ST}$ to a human operator.

The instructions may further cause the processing device to provide the estimated drillstring torque $T_{ST}$ to a controller operable to automatically initiate an action based thereon.

The instructions may further cause the processing device to automatically initiate an action based on the estimated drillstring torque $T_{ST}$.

The instructions may further cause the processing device to utilize the estimated drillstring torque $T_{ST}$ to determine a STOPI. The instructions may further cause the processing device to display to a human operator at least one of the estimated drillstring torque $T_{ST}$ and the determined STOPI. The instructions may further cause the processing device to provide at least one of the estimated drill string torque $T_{ST}$ and the determined STOPI to a controller operable to automatically initiate an action based thereon. The instructions may further cause the processing device to automatically initiate an action based on at least one of the estimated drillstring torque $T_{ST}$ and the determined STOPI.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to permit the reader to quickly ascertain the nature of the technical disclosure. It is submitted with the understanding that it will not be used to interpret or limit the scope or meaning of the claims.

What is claimed is:

1. A method comprising:
   obtaining raw surface data for present values of torque ($T_{TD}$ data) generated by a top drive operably coupled with a drillstring;
   obtaining raw surface data for present values of rotational speed (ω data) of the top drive corresponding to the $T_{TD}$ data;
   obtaining inertia ($J_{TD}$ data) of the top drive;
   estimating torque $T_{ST}$ of the drillstring based on the obtained $T_{TD}$ data, the obtained ω data, and the obtained $J_{TD}$ data; and
   determining a surface torque oscillation performance index (STOPI) based on the estimated $T_{ST}$, wherein the STOPI comprises a ratio of:
   an amplitude of torque oscillations in the estimated $T_{ST}$ over a dynamically specified time window; and
   a constant reference torque.

2. The method of claim 1 wherein the $T_{TD}$ data is obtained from a sensor associated with the top drive.

3. The method of claim 1 wherein the $T_{TD}$ data is obtained from a variable-frequency drive related to the top drive.

4. The method of claim 1 wherein the $T_{TD}$ data is obtained from a torque sub disposed between the drillstring and the top drive.

5. The method of claim 1 further comprising:
filtering the obtained $T_{TD}$ data to obtain filtered $T_{TD}$ ($T_{TD\text{-}f}$) data; and
filtering the obtained $\omega$ data to obtain filtered $\omega$ ($\omega_f$) data;
wherein estimating the $T_{ST}$ is based on the filtered $T_{TD\text{-}f}$ data, the filtered $\omega_f$ data, and the obtained $J_{TD}$ data.

6. The method of claim 5 wherein filtering the obtained $T_{TD}$ data and the obtained $\omega$ data is low-pass filtering with predetermined, low-pass frequencies in response to a formation being drilled via operation of the top drive having a substantially constant composition.

7. The method of claim 5 wherein estimating the $T_{ST}$ comprises using equation $T_{ST}=T_{TD\text{-}f}-J_{TD}\alpha_{TD}$, wherein $\alpha_{TD}$ is a rotational acceleration of the top drive that is calculated based on changes in the filtered $\omega_f$ data over time.

8. The method of claim 1 comprising determining a moving window length for the dynamically specified time window via estimating a fundamental oscillation time period ($T_1$).

9. The method of claim 8 wherein estimating the $T_1$ is based on moment of inertia (J) of the drillstring, density ($\rho$) of the drillstring, cross-sectional polar moments (I) of components of the drillstring, lengths (L) of the drillstring components, torsional stiffness (K) of the drillstring, and shear modulus (G) of material forming the drillstring.

10. The method of claim 1 wherein the constant reference torque is:
rated torque of the top drive; or
an off-bottom torque; or
an at-bottom torque.

11. The method of claim 1 wherein determining the STOPI further comprises limiting the ratio between predetermined, configurable maximum and minimum values.

12. The method of claim 1 further comprising displaying via a display device:
the estimated $T_{ST}$; and
the determined STOPI.

13. The method of claim 1 further comprising providing at least one of the estimated $T_{ST}$ and the determined STOPI to a controller operable to automatically initiate an action based thereon.

14. The method of claim 1 further comprising displaying the estimated $T_{ST}$ via a display device.

15. The method of claim 1 further comprising providing the estimated $T_{ST}$ to a controller operable to automatically initiate an action based thereon.

16. The method of claim 1 wherein the constant reference torque comprises rated torque of the top drive.

17. The method of claim 1 further comprising displaying the determined STOPI via a display device.

18. An apparatus comprising:
a first sensor operable for obtaining raw surface data for present values of torque ($T_{TD}$ data) generated by a top drive operably coupled with a drillstring;
a second sensor operable for obtaining raw surface data for present values of rotational speed ($\omega$ data) of the top drive corresponding to the $T_{TD}$ data; and
a processing device comprising a processor and a memory storing computer program code, wherein the processing device is operable to:
obtain inertia ($J_{TD}$ data) of the top drive;
estimate torque $T_{ST}$ of the drillstring based on the obtained $T_{TD}$ data, the obtained $\omega$ data, and the obtained $J_{TD}$ data; and
determine a surface torque oscillation performance index (STOPI) based on the estimated $T_{ST}$, wherein the STOPI comprises a ratio of:
an amplitude of torque oscillations in the estimated $T_{ST}$ over a dynamically specified time window; and
a constant reference torque.

19. A computer program product comprising:
a non-transitory, computer-readable medium having instructions recorded thereon that, when executed by a processing device having a processor and a memory, cause the processing device to:
obtain raw surface data for present values of torque ($T_{TD}$ data) generated by a top drive operably coupled with a drillstring;
obtain raw surface data for present values of rotational speed ($\omega$ data) of the top drive corresponding to the $T_{TD}$ data;
obtain inertia ($J_{TD}$ data) of the top drive;
estimate torque $T_{ST}$ of the drillstring based on the obtained $T_{TD}$ data, the obtained $\omega$ data, and the obtained $J_{TD}$ data; and
determine a surface torque oscillation performance index (STOPI) based on the estimated $T_{ST}$, wherein the STOPI comprises a ratio of:
an amplitude of torque oscillations in the estimated $T_{ST}$ over a dynamically specified time window; and
a constant reference torque.

20. The computer program product of claim 19 wherein the instructions, when executed by the processing device, cause the processing device to:
filter the obtained $T_{TD}$ data to obtain filtered $T_{TD}$ ($T_{TD\text{-}f}$) data; and
filter the obtained $\omega$ data to obtain filtered $\omega$ ($\omega_f$) data;
wherein estimating the $T_{ST}$ is based on the filtered $T_{TD\text{-}f}$ data, the filtered $\omega_f$ data, and the obtained $J_{TD}$ data;
wherein filtering the obtained $T_{TD}$ data and the obtained $\omega$ data comprises:
low-pass filtering with predetermined, low-pass frequencies in response to a formation being drilled via operation of the top drive having a substantially constant composition; else
band-pass filtering with predetermined, band-pass frequencies.

* * * * *